United States Patent [19]

Orsino et al.

[11] Patent Number: 4,472,486
[45] Date of Patent: Sep. 18, 1984

[54] TERMINAL SUPPORT MEMBER

[75] Inventors: Joseph A. Orsino, Diamond Bar; Ronald J. Hollett, Glendora; Ernest R. Sawyer, Solano Beach, all of Calif.

[73] Assignee: Concorde Battery Corporation, West Covina, Calif.

[21] Appl. No.: 492,150

[22] Filed: May 6, 1983

[51] Int. Cl.³ ............................................ H01M 2/02
[52] U.S. Cl. ..................................... 429/179; 429/176
[58] Field of Search ............................. 429/179–184, 429/176

[56] References Cited

U.S. PATENT DOCUMENTS

| | | | |
|---|---|---|---|
| 4,121,017 | 10/1978 | Dougherty et al. | 429/178 X |
| 4,237,198 | 12/1980 | Eby et al. | 429/178 X |
| 4,239,841 | 12/1980 | Rorer | 429/179 |
| 4,288,504 | 9/1981 | Julian et al. | 429/179 |
| 4,337,301 | 6/1982 | Rorer et al. | 429/184 X |

Primary Examiner—Charles F. LeFevour
Attorney, Agent, or Firm—Keith D. Beecher

[57] ABSTRACT

A molded plastic receptacle for a lead-acid aircraft battery, or the like, which is adapted to be mounted on the side wall of the battery comprising threaded pin terminals which extend through the receptacle and which are molded to the receptacle. The receptacle is formed of a polycarbonate thermoplastic resin which is sufficiently strong to permit the receptacle to be mounted on the side wall of the battery by screws extending through holes in the receptacle and without any need to provide metal bushings in the holes.

2 Claims, 1 Drawing Figure

TERMINAL SUPPORT MEMBER

BACKGROUND OF THE INVENTION

The receptacle of the invention will be described in conjunction with a lead-acid aircraft battery. In general, this type of battery usually comprises a plastic interior casing containing interleaved lead and lead-oxide plates immersed in an acid electrolyte. A metal exterior housing composed, for example, of aluminum is provided for the plastic casing. The lead and lead-oxide plates within the casing are interconnected and are connected to internal terminals which project through the cover of the casing. External terminals for the battery are molded to a receptacle which is mounted on the side wall of the battery, and these external terminals extend through the receptacle and are connected to the internal terminals.

The receptacle used in the prior art batteries is usually formed of phenolformaldehyde, or other thermosetting resin. However, this material is somewhat brittle, and it is necessary in the prior art to provide metal bushings in the mounting holes of the receptacle. These metal bushings add materially to the expense involved in producing the prior art receptacles.

The receptacle of the present inventon is made of a thermoplastic material, such as a polycarbonate resin, and may be produced at a fraction of the cost of the prior art receptacles since no metal bushings are required in the mounting holes.

DETAILED DESCRIPTION OF THE ILLUSTRATED EMBODIMENT

Figure 1:
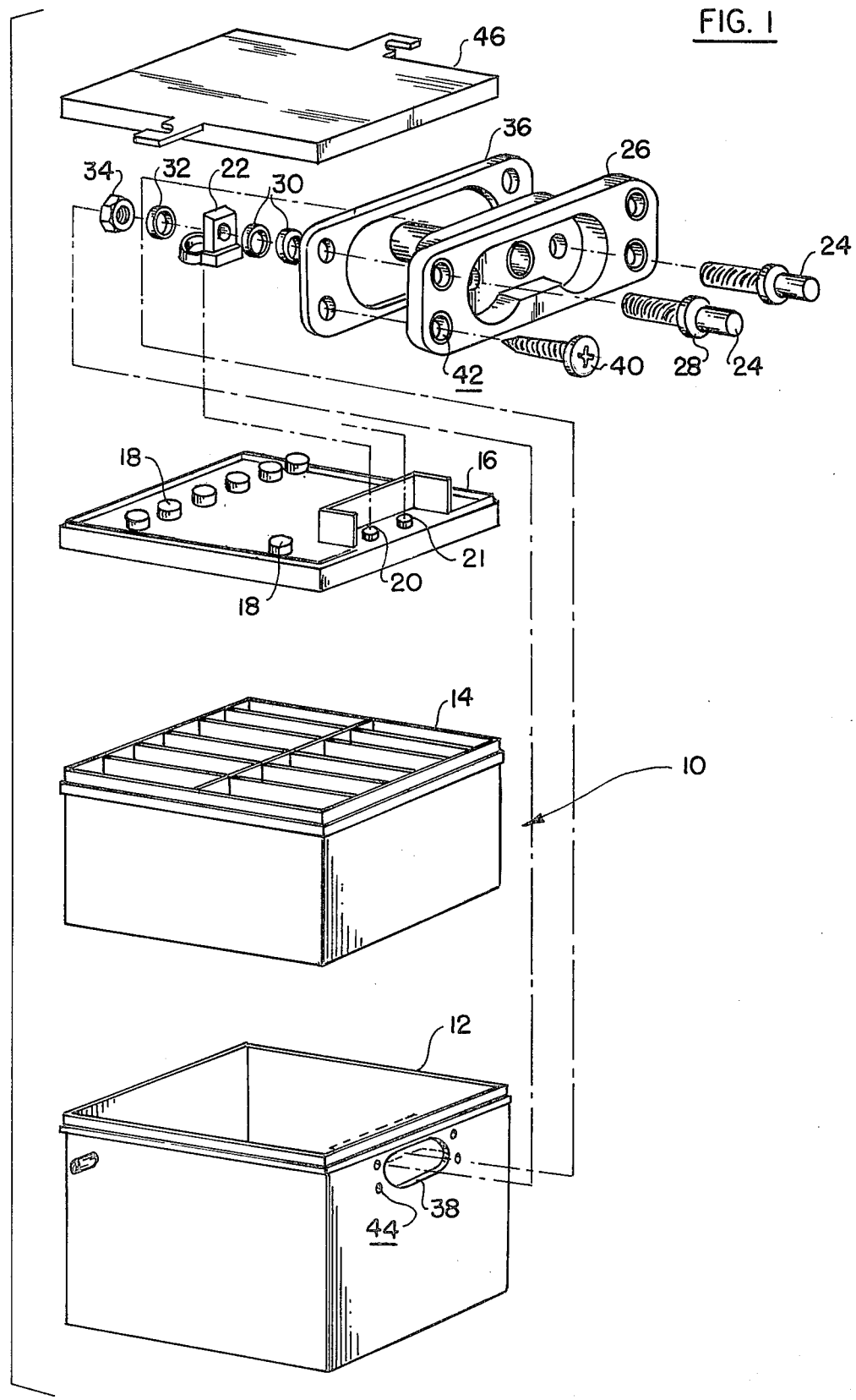
FIG. 1 is an exploded perspective view of an aircraft battery incorporating a receptacle embodying the teaching of the invention.

Referring now to the drawing, a lead-acid aircraft battery 10 is illustrated in an exploded perspective form. The battery 10 comprises an external housing 12 normally constructed of aluminum, and which serves to isolate the battery from electrical interference. A molded interior casing 14 is contained within housing 12, the interior casing usually being constructed of appropriate plastic material such as polyethylene. The interior casing has a number of separate cavities, and lead and lead-oxide plates are placed in the cavities, and are immersed in an electrolyte material.

Casing 14 is covered by a cover 16 which may also be constructed of a molded plastic material, such as polyethylene. A number of vent plugs 18, constructed in known manner, are mounted on the cover 16 and project upwardly from the cover. The vent plugs 18 are used to release gas pressure build-up within the battery 10 during operation of the battery.

The lead and lead-oxide plates within the casing 14 are separated and interconnected in known manner, and these plates are connected to negative and positive terminals 20 and 21 in cover 16.

Each of the terminals 20 and 21 is permanently connected to an L-shaped electrically conductive metallic member 22. Member 22 has an aperture extending horizontally through it, and through which extends one end of a terminal pin 24. Two such terminal pins project horizontally form the exterior of battery 10 and through circular apertures in a receptacle 26. Each metallic pin 24 has a shoulder 28. The pins are molded in the receptacle 26. The threaded ends of the respective pins 24 extend through receptacle 26, and each pin extends through a pair of washers 30, and an aperture in the electrically conductive metallic member 22 to receive another washer 32 and a nut 34.

As may be seen from FIG. 1, receptacle 26 fits through a gasket 36 which may be formed of a plastic, such as polypropylene, and into an opening 38 in the side of housing 12. The receptacle 26 is secured to the housing by four screws, such as screw 40, which extend through apertures, such as aperture 42, in the receptacle, to be threaded into holes, such as hole 44, in housing 12.

The battery is assembled in the following manner. Lead and lead-oxide plates are placed in casing 14, and are interconnected in known manner. The L-shaped metallic members 22 are connected to the terminals 20 and 21, and cover 16 is sealed to casing 14. Then, casing 14 is placed in the exterior housing 12. The receptacle 26 is positioned in aperture 38 in housing 12, and in gasket 36. The individual terminal pins extend through the washers 30 and 32 and through the metallic members 22, and are held in place by nuts 34.

The screws 40 are inserted and tightened into the holes 44. Once the receptacle 26 with pins 24 has been mounted in place, the area surrounding the terminals 20 and 21 is covered with a liquid resin for protective purposes, and casing 14 is sealed to housing 12. Finally, an aluminum cover 46 is placed over the housing 12. The battery 10 is now ready for use. External connections to terminals 24 are normally made by a socket containing female receptacles for connections to the terminal pins.

Receptacle 26 is formed of a thermoplastic resin, such as a polycarbonate, and is strong and rugged. This receptacle is molded, and may be produced simply and inexpensively. The composition of the receptacle is such that there is no requirement for metal bushings within the apertures 42, as is the case in the prior art receptacles.

It will be appreciated that while a particular embodiment of the invention has been shown and described, modifications may be made. It is intended in the claims to cover all modifications which come within the spirit and scope of the invention.

What is claimed is:

1. An aircraft battery comprising: a housing having an aperture in a wall thereof, a casing having a pair of electrical conductors leading therefrom, a cover for the casing through which the pair of conductors protrudes, a pair of electrically conductive members each connected to one of the conductors and each having an aperture therein aligned with the aperture in the wall of the housing, a receptacle formed of a polycarbonate resin positoned within the aperture in the wall of the housing and having apertures therein aligned with the apertures in the electrically conductive members; a pair of electrically conductive terminal pins molded to the receptacle and each being threaded at one end, and each pin being positioned with its threaded end passing through the corresponding aperture in the receptacle and through the aperture in the corresponding electrically conductive member, said receptacle having mounting holes extending therethrough, and a plurality of mounting screws extending through the mounting holes for mounting the receptacle to the wall of the housing, with the receptacle material forming the sole supporting means on the receptacle for the screws.

2. The receptacle defined in claim 1, in which the electrically conductive terminal pins are formed of stainless steel.

* * * * *